Jan. 26, 1965 W. J. OLIPHANT 3,167,082
PRESSURE REGULATING VALVE
Filed Dec. 27, 1962 2 Sheets-Sheet 1

INVENTOR.
WILLIAM J. OLIPHANT
BY
ATTORNEYS

Jan. 26, 1965  W. J. OLIPHANT  3,167,082
PRESSURE REGULATING VALVE
Filed Dec. 27, 1962  2 Sheets-Sheet 2

INVENTOR.
WILLIAM J. OLIPHANT
BY Wade Koontz
Louis E. ...
ATTORNEYS

United States Patent Office 3,167,082
Patented Jan. 26, 1965

3,167,082
PRESSURE REGULATING VALVE
William J. Oliphant, Wakefield, Mass., assignor, by mesne assignments, to the United States of America as represented by the Secretary of the Air Force
Filed Dec. 27, 1962, Ser. No. 247,776
3 Claims. (Cl. 137—18)

This is a continuation-in-part application of application Serial Number 65,152, filed October 26, 1960.

This invention relates to improved pressure regulating valves and, more specifically, to such valves as used in connection with the control of liquid fuel flow to axial flow aircraft engines and the like.

Axial flow aircraft engines, such as turbo-jet engines, unlike most internal combustion engines, are required to be operable over an extremely wide range of altitudes. Likewise, such engines which must be operated at an optimum tmperature for good efficiency, are extremely sensitive to variations in barometric pressure, ambient air temperature, and other environmental parameters affecting the performance of the engine. Such engines are usually governed by controlling the fuel input.

The liquid fuel input may be metered into the engine through one of the pressure regulating valves of this invention, in which the fuel is metered by maintaining a predetermined pressure drop across a metering orifice; the predetermined pressure drop being corrected to compensate for the above-mentioned environmental variations. Furthermore, such valves must have a variable metering orifice to fuel the engine for various power output requirements.

A primary object of this invention is to provide a pressure regulating valve capable of maintaining a predetermined pressure drop across a metering orifice when set to a predetermined position.

It is a further object of this invention to provide a pressure regulating valve in which the pressure drop across the metering orifice will establish the rate of liquid fuel flow to an axial flow engine such as a turbo-jet engine.

Another object of this invention is to provide a pressure regulating valve in which the predetermined pressure drop across the metering orifice may be varied by outside control parameters.

Additional objects, advantages and features of the invention reside in the construction, arrangement and combination of parts involved in the embodiments of the invention as will appear from the following description and accompanying drawings, wherein.

Figure 1:
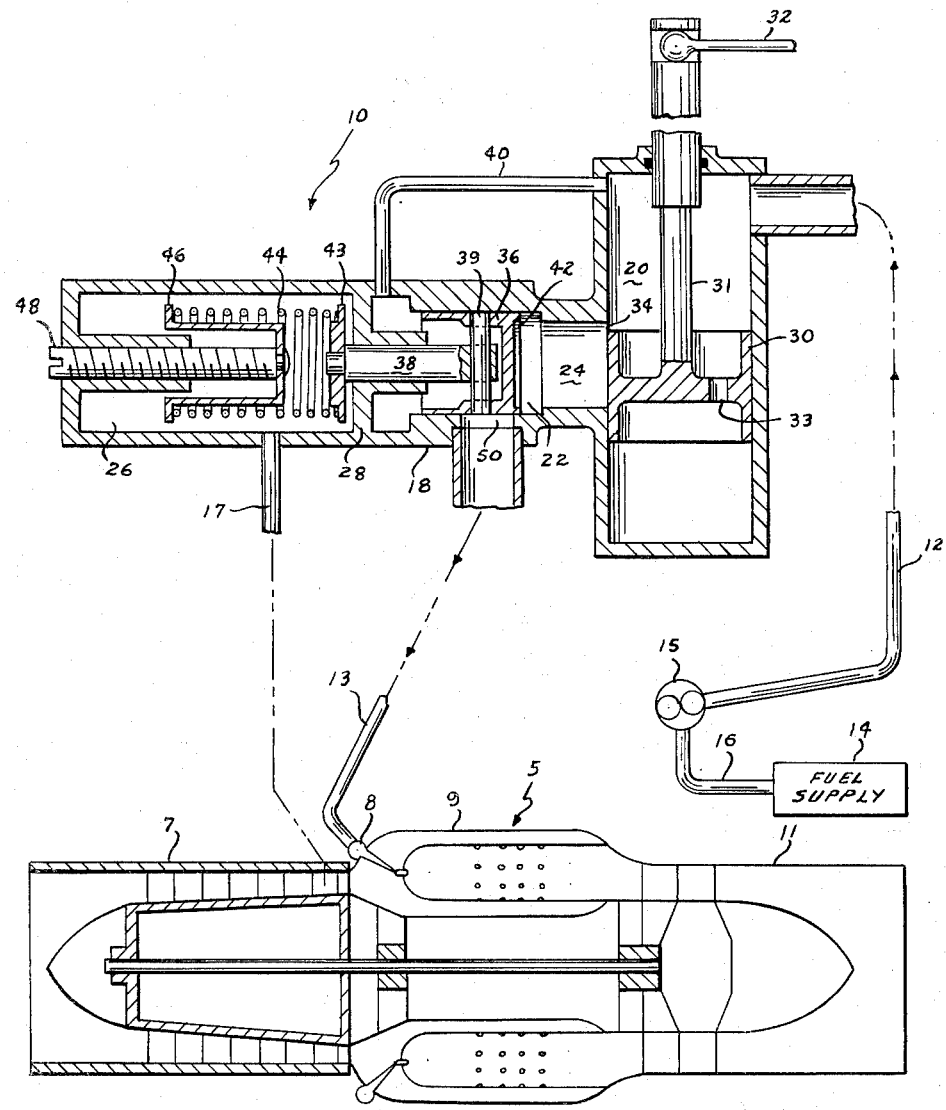
FIG. 1 is a cross-sectional view through a first embodiment of the invention and showing in schematic the application of the valve to an engine and its fuel system.

Referring in particular to FIG. 1, the valve of this invention is shown in operable relationship to a typical turbo-jet engine referred to generally as engine 5 and comprising a compressor section 7, a combustion section 9 and a turbine and nozzle section 11. Coaxial with the engine so defined is a liquid fuel manifold 8 for receiving fuel and feeding it into the fuel nozzles in combustion section 9.

The regulating valve referred to generally as valve 10 is interposed between inlet fuel line 12 and outlet fuel line 13; the direction of flow being indicated by suitable arrows. The fuel is taken from fuel supply 14 from which it is drawn into pump 15 through intake pipe 16 and discharged into pipe 12. Valve 10 is further joined to engine 5 by a tube 17 for a purpose to be hereinafter described.

Valve 10 has a body 18 having a first or vertical cylinder 20, a second or horizontal cyclinder 22 communicating with cylinder 20 through passage 24 and a pressure chamber 26 coaxial with and partitioned from cylinder 22 by partition 28.

Axially slidable within cylinder 20 is metering valve element 30 provided with stem 31 extending through the body and axially movable by arm 32 which is actuated from the pilot's quadrant in the cockpit of the airplane. The metering valve element 30 contains a passage 33 permitting fluid transfer to prevent hydraulic block of any fluid entrapped below the valve element. The metering valve element 30 may be positioned to completely close passage 24 and stop all fluid flow, or it may be positioned to open the passage to a varying degree to provide a metering orifice 34 through which the liquid fuel may flow from inlet fuel line 12, through cylinder 20 and into passage 24.

Axially slidable within cylinder 22 is pressure regulating valve element 36. Stem 38, which is axially slidable through a bore in partition 28, is joined at one end to the pressure regulating valve element 36 by means of pin 39. The opposite end of stem 38 extends into pressure chamber 26. A control passage or tube 40 connects the inlet or high pressure side of cylinder 20 on the upstream side of metering valve element 30 to the cylinder 22 on the stem side of regulating valve element 36. It is noted from the configuration of elements that the pressure regulating valve element 36 is "unbalanced" in that the effective area of face 42 is greater than the effective area of the stem side of the element by an amount equal to the cross-sectional area of stem 38. It is further noted at this time that face 42, which has the greatest effective area, is in communication with the low pressure downstream side of the metering orifice 34, while the opposite side of the regulating element 36 is in communication with the high pressure upstream side of the metering orifice.

Joined to the end of stem 38 within pressure chamber 26 is spring saddle 43 supporting one end of compression spring 44, the opposite end of which engages stirrup 46 joined to adjusting screw 48 in a manner permitting rotation of the screw without rotating the stirrup. The adjusting screw 48 which threadably engages body 18 is used to adjust spring tension during calibration of the valve. Spring 44, which is shown as a conventional helical compression spring, may be in a form having nonlinear characteristics, if it is desired to have a nonlinear spring for programing purposes.

The valve is designed to permit the fluid pressure on the downstream side of metering orifice 34, acting on face 42 of the regulating valve element 36, to overcome the effect of the higher upstream pressure acting on the stem side of the regulating valve element 36 which is moved to the left against the compression spring 44 to thereby open to a degree the discharge port 50 which communicates with outlet fuel line 13. It is obvious that the regulating valve element 36 will move to a balanced position in which the force applied on face 42 will equal the combined force on the opposite side as produced by the upstream fluid pressure plus the spring. When both the metering valve element 30 and the regulating valve element 36 are in a position opening ports 34 and 50 respectively, the fluid will flow through the ports in series. With pump 15 maintaining a constant output pressure, the valve may be designed and programed to have a predetermined pressure drop across the metering orifice 34 for each setting of metering valve element 30. By controlling the pressure drop across the metering orifice, the fuel flow into the engine is in turn controlled.

Pressure chamber 26 provides the means for correcting the fuel flow into the engine for the environmental variations previously mentioned. Pressure within the chamber may be varied to accordingly supplement the action of the compression spring. For example: if the otherwise normal fuel flow is too great for the particular environment, the pressure within the chamber 26 may be increased, and this increased pressure acting on the end of stem 38 supplements the spring to bring the balanced position of regulating valve element 36 slightly to the right, thereby reducing the area of port 50 to restrict fuel flow. Since the forces acting on the stem side of the regulating valve element have been increased, pressure in passage 24 must increase to balance, and the pressure drop across metering orifice is reduced.

Pressure chamber 26 may be either pneumatic or hydraulic. Since the source of the pressure signal in tube 17 does not constitute a portion of this invention, it is shown for convenience as coming from the rear of the compressor. This signal could also be taken from a device (not shown) which integrates a plurality of environmental parameters into a composite signal which pressurizes the pressure chamber 26.

On engine shut down, the metering valve element closes the metering orifice 34 and stops the fuel flow. As the fuel pressure downstream from the metering orifice decays, the compression spring forces the regulating valve element 36 to the right to close port 50. This provides the practical effect of having two closed valves in series as assurance against residual seepage of fuel into the engine.

Figure 2:
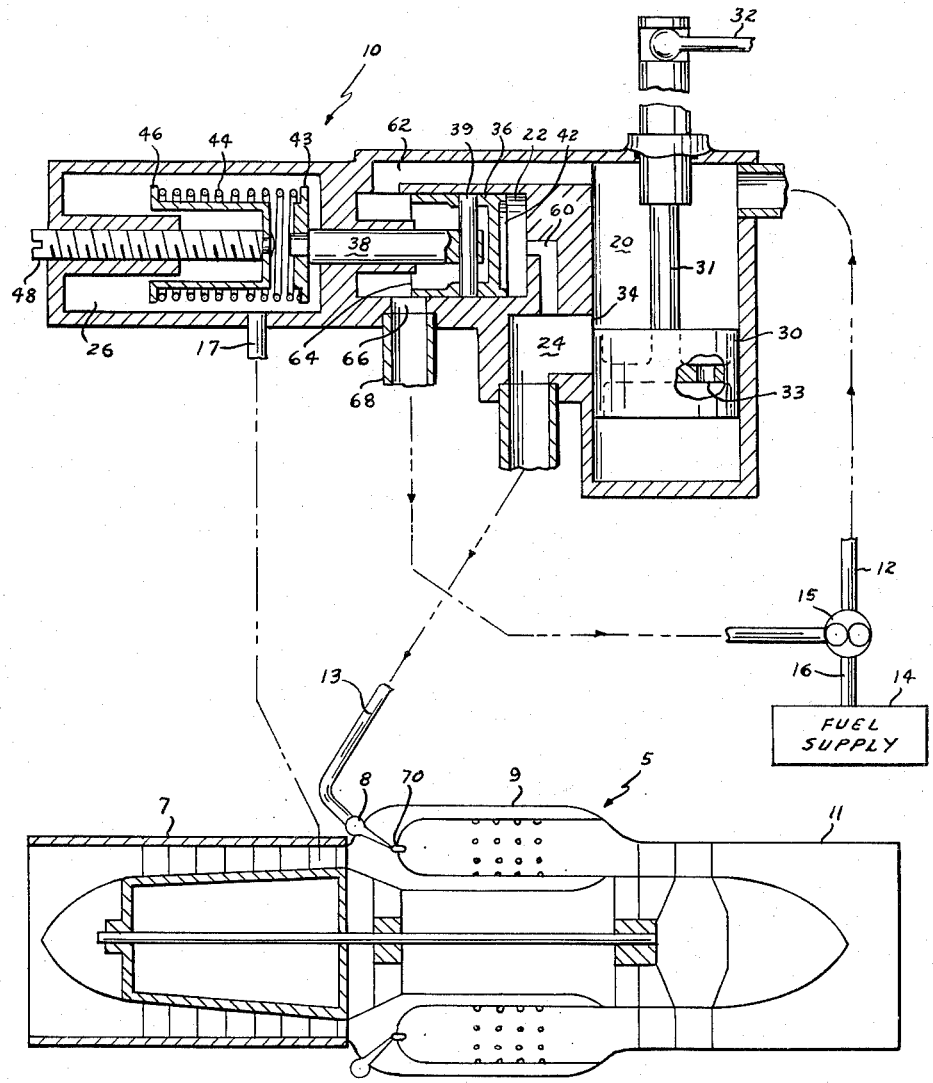
FIG. 2 is a view, similar to FIG. 1, showing a second embodiment of the invention.

A second embodiment of the invention, in which like element have like numerals, is shown on FIG. 2. Whereas the first embodiment had a metering valve and a regulating valve in series to provide a single fluid flow from the valve, the present embodiment has the metering valve and the regulating valve in parallel to provide two fluid flow paths from the valve.

Referring to FIG. 2, a passage 60 connects passage 24 with cylinder 22 in a manner permitting fluid pressure within passage 24 to act against face 42 of regulating valve element 36. Control passage 62 connects the upstream side of vertical cylinder 20 with the partitioned end of cylinder 22. Although control passage 62 is shown within the body, it could as readily be an external tube as shown on the embodiment of FIG. 1. The cup edge 64 in sliding cooperation with bypass port 66, provides a second variable orifice through which liquid fuel flows from the valve into return line 68 and on to the fuel supply at the inlet side of pump 15.

It is thus seen that a pressure regulating valve is provided in which the pressure drop across the metering orifice 34 is maintained by controlling the pressure of the fuel on the upstream side of the metering orifice. Should the pressure in passage 24 rise because of a plugged or sticky fuel nozzle 70 on the engine, the regulating valve element 36 will move to the left and reduce the fuel bypassed through return line 68. This in turn will produce an increase in fluid pressure on the upstream side of the metering orifice, which in turn will increase the fluid pressure in passage 24 until the fuel flow to the engine is again flowing normally. Because the pump output is always greater than engine requirements, the pressure within passage 24 will not drop below normal except on engine start up or shut down. Any pressure increase in the pressure chamber 26 will decrease the otherwise normal pressure within passage 24 since the metering valve element 36 is moved to the right; thereby increasing the bypassed fuel to reduce the upstream pressure at metering orifice 34.

It is to be understood that the embodiments of the present invention as shown and described are to be regarded as illustrative only and that the invention is susceptible to variations, modifications and changes within the scope of the appended claims.

I claim:
1. In a fuel supply system for a turbo jet engine; a pressure regulating valve interposed in the fuel system for regulating the fuel to said engine and comprising: a body member containing a first cylinder having an inlet for receiving liquid, a second cylinder, a passage extending from the sidewall of said first cylinder to an adjacent first end of said second cylinder, a discharge port for discharging the liquid flowing through said passage in the sidewall of said first cylinder to said engine, and a pressure chamber coaxial with and partitioned from a second end of said second cylinder, said pressure chamber having passage means for receiving a variable correction pressure from an external source; a metering valve element within said first cylinder and having a stem extending from said body for positioning said metering valve element, said metering valve element being axially slidable within said first cylinder for closing and for establishing a variable area to any degree of opening of said passage in the sidewall of said first cylinder to provide a metering orifice for the liquid flowing from said first cylinder into said passage; a pressure regulating valve element within said second cylinder and having a stem extending through the partitioned second end of said second cylinder into said pressure chamber, said pressure regulating valve element being axially slidable to vary the pressure drop across said metering orifice in said first cylinder throughout all operating conditions of the engine; a control passage connecting the inlet end of said first cylinder upstream from said metering orifice to said second cylinder to be between the partitioned second end thereof and the stem end of said pressure regulating valve element therein; and a compression spring within said pressure chamber operably acting on the stem of said pressure regulating valve element; said stem being of such cross-sectional area as will reduce the effective area of the stem side of said pressure regulating valve element to an effective area sufficiently less than the opposing free face area thereof in communication with the downstream pressure of said metering orifice in said first cylinder that during normal operation the force produced by the metered downstream pressure acting on the larger free face area of said pressure regulating valve element is greater than the force produced by the higher upstream pressure acting on the stem side thereof to thus move said pressure regulating valve element in the direction of said compression spring until a balance is established, said variable correction pressure acting within said pressure chamber at all times in supplementing the action of said compression spring.

2. In a fuel supply system for a turbo jet engine, a pressure regulating valve interposed in the fuel system for regulating the fuel to said engine and comprising: a body member containing a first cylinder having an inlet for receiving liquid, a second cylinder, a passage extending from the sidewall of said first cylinder to an adjacent first end of said second cylinder, a discharge port in the sidewall of said second cylinder for discharging liquid to said engine, and a pressure chamber coaxial with and partitioned from a second end of said second cylinder, said pressure chamber having passage means for receiving a variable correction pressure from an external source; a metering valve element within said first cylinder and having a stem extending from said body for positioning said metering valve element, said metering valve element being axially slidable within said first cylinder for closing and for establishing a variable area to any degree of opening of said passage in the sidewall of said first cylinder to provide a metering orifice for the liquid flowing from said first cylinder into said second cylinder through said passage; a pressure regulating valve element within said second cylinder and having a stem extending through the partitioned second end of said second cylinder into said pressure chamber, said pressure regulating valve element being axially slidable for closing and for establishing a variable area opening of said discharge port in said second cylinder to thereby influence the pressure drop across said metering orifice in said first cylinder throughout all operating conditions of the engine; a control passage connecting the inlet end of said first cylinder upstream from said metering orifice to said second cylinder to be between the partitioned second end thereof and the stem end of said pressure regulating valve element therein; and a compression spring within said pressure chamber operably acting on the stem of said pressure regulating valve element for biasing said pressure regulating valve element against the opposing action produced by the fluid pressure on the downstream side of said metering orifice, and on fluid pressure decay for closing said discharge port in the sidewall of said second cylinder; said stem being of such cross-sectional area as will reduce the effective area of the stem side of said pressure regulating valve element to an effective area sufficiently less than the opposing free face area thereof in communication with the downstream pressure of said metering orifice in said first cylinder that during normal operation the force produced by the metered downstream pressure acting on the larger free face area of said pressure regulating valve element is greater than the force produced by the higher upstream pressure acting on the stem side thereof to thus move said pressure regulating valve element in the direction of said compression spring until a balance is established, said variable correction pressure acting within said pressure chamber at all times in supplementing the action of said compression spring.

3. In a fuel supply system for a turbo jet engine including a fuel pump for supplying fuel to said engine, a pressure regulating valve interposed in the fuel system for regulating the fuel to said engine and comprising: a body member containing a first cylinder having an inlet for receiving liquid, a second cylinder, a flow passage extending from the sidewall of said first cylinder to an adjacent first end of said second cylinder, a discharge port for discharging the liquid flowing through said flow passage to said engine, a pressure chamber coaxial with and partitioned from a second end of said second cylinder, said pressure chamber having passage means for receiving a variable correction pressure from an external source, and a bypass port in the sidewall of said second cylinder proximate to the partitioned second end thereof for bypassing fluid from said second cylinder to the inlet side of the fuel pump in said fuel system; a metering valve element within said first cylinder and having a stem extending from said body for positioning said metering valve element, said metering valve element being axially slidable within said first cylinder for closing and for establishing a variable area to any degree of opening of said flow passage to provide a metering orifice for the liquid flowing from said first cylinder into said flow passage; a pressure regulating valve element within said second cylinder and having a stem extending through the partitioned second end of said second cylinder into said pressure chamber; a control passage connecting the inlet end of said first cylinder upstream from said metering orifice to said second cylinder to be between the partitioned second end thereof and the stem end of said pressure regulating valve element therein; said pressure regulating valve element being axially slidable for variably changing the area of said bypass port to vary the amount of liquid bypassed and thereby influence the pressure drop across the metering orifice in said first cylinder throughout all operating conditions of the engine; and a compression spring within said pressure chamber operably acting on the stem of said pressure regulating valve element for biasing said regulating valve element against the opposing action produced by the fluid pressure on the downstream side of said metering orifice and on fluid pressure decay to open said bypass port; said stem being of such cross-sectional area as will reduce the effective area of the stem side of said pressure regulating valve element to an effective area sufficiently less than the opposing free face area thereof in communication with the downstream pressure of said metering orifice in said first cylinder that during normal operation the force produced by the metered downstream pressure acting on the larger free face area of said pressure regulating valve element is greater than the force produced by the upstream pressure acting on the stem side thereof to thus move said pressure regulating valve element in the direction of said compression spring until a balance is established, said variable correction pressure acting within said pressure chamber at all times in supplementing the action of said compression spring.

References Cited by the Examiner
UNITED STATES PATENTS

| | | | |
|---|---|---|---|
| 2,139,050 | 12/38 | Vickers | 137—501 |
| 2,146,537 | 2/39 | Farnham | 137—501 |
| 2,638,739 | 5/53 | Barr | 60—39.28 |
| 2,714,803 | 8/55 | Abild | 60—39.28 |
| 3,032,986 | 5/62 | Wright | 60—39.28 |

SAMUEL LEVINE, *Primary Examiner.*